United States Patent
Wright et al.

(10) Patent No.: US 6,865,194 B1
(45) Date of Patent: Mar. 8, 2005

(54) STRAIN-ISOLATED BRAGG GRATING TEMPERATURE SENSOR

(75) Inventors: Christopher J. Wright, Amston, CT (US); Mark R. Fernald, Enfield, CT (US); Timothy J. Bailey, Longmeadow, MA (US); James M. Sullivan, Manchester, CT (US); James R. Dunphy, South Glastonbury, CT (US); Michael A. Davis, Glastonbury, CT (US); Alan D. Kersey, South Glastonbury, CT (US); Martin A. Putnam, Cheshire, CT (US); Robert N. Brucato, Waterbury, CT (US); Paul E. Sanders, Madison, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/455,866

(22) Filed: Dec. 6, 1999

Related U.S. Application Data

(63) Continuation-in-part of application No. 09/400,364, filed on Sep. 20, 1999, now abandoned, which is a continuation-in-part of application No. 09/205,847, filed on Dec. 4, 1998, now abandoned.

(51) Int. Cl.[7] .......................... H01S 3/30; G01N 21/00
(52) U.S. Cl. ......................................... 372/6; 356/73.1
(58) Field of Search .............................. 372/6, 43, 96, 372/20; 356/73.1, 477; 385/12, 73, 92, 37

(56) References Cited

U.S. PATENT DOCUMENTS 4,295,739 A  * 10/1981  Meltz et al. ................... 356/43
4,636,031 A     1/1987  Schmadel, Jr. et al. .. 350/96.19

(List continued on next page.)

FOREIGN PATENT DOCUMENTS

DE          19724528        12/1998
EP           0162303        12/1991

(List continued on next page.)

OTHER PUBLICATIONS

Song E.A.: "Simultaneous Measurement of Temperature and Strain Using Two Fiber Bragg Gratings Embedded in a Glass Tube" Optical Fiber Technology, US, Academic Press, London, vol. 3, No. 2, Apr. 1, 1997 pp. 194–196, XP002083806, ISSN: 1068–5200—the whole document.

(List continued on next page.)

*Primary Examiner*—Minsun Oh Harvey
*Assistant Examiner*—James Menefee

(57) ABSTRACT

A strain-isolated bragg grating temperature sensor includes an optical sensing element 20,600 which includes an optical fiber 10 having at least one Bragg grating 12 disposed therein which is encased within and fused to at least a portion of a glass capillary tube 20 and/or a large diameter waveguide grating 600 having a core and a wide cladding and having the grating 12 disposed therein, which senses temperature changes but is substantially not sensitive to strains on the element caused by the fiber or other effects. Light 14 is incident on the grating 12 and light 16 is reflected at a reflection wavelength $\lambda 1$. The shape of the sensing element 20,600 may be other geometries and/or more than one concentric tube may be used or more than one grating or pair of gratings may be used or more than one fiber or optical core may be used. At least a portion of the element 20,600 may be doped between a pair of gratings 150,152, disposed therein to form a temperature tunable laser or the grating 12 or gratings 150,152 may be constructed as a temperature tunable DFB laser disposed in the element. Also, the element may have an inner or outer tapered regions 22,27, respectively, to provide strain relief and/or added pull strength for the fiber 10. Further, the fiber 10 and the tube 20 may be made of different coefficients of thermal expansion for increased sensitivity.

26 Claims, 4 Drawing Sheets

U.S. PATENT DOCUMENTS

| | | | | |
|---|---|---|---|---|
| 4,704,151 | A | | 11/1987 | Keck .......................... 65/4.1 |
| 4,915,467 | A | | 4/1990 | Berkey ................... 350/96.15 |
| 4,932,263 | A | | 6/1990 | Wlodarczyk ................. 73/705 |
| 4,948,217 | A | | 8/1990 | Keck et al. ............. 350/96.15 |
| 5,007,705 | A | | 4/1991 | Morey et al. ........... 350/96.29 |
| 5,042,898 | A | | 8/1991 | Morey et al. ................. 385/37 |
| 5,136,677 | A | | 8/1992 | Drexhage et al. ........... 385/123 |
| 5,202,939 | A | | 4/1993 | Belleville et al. ............. 385/12 |
| 5,235,659 | A | | 8/1993 | Atkins et al. ............... 385/124 |
| 5,317,576 | A | * | 5/1994 | Leonberger et al. .......... 372/6 |
| 5,349,600 | A | * | 9/1994 | Shinbori et al. .............. 372/92 |
| 5,367,589 | A | | 11/1994 | MacDonald et al. ......... 385/37 |
| 5,392,117 | A | | 2/1995 | Belleville et al. ........... 356/352 |
| 5,399,854 | A | | 3/1995 | Dunphy et al. ........ 250/227.17 |
| 5,469,520 | A | | 11/1995 | Morey et al. ................. 385/37 |
| 5,511,083 | A | | 4/1996 | D'Amato et al. ............. 372/6 |
| 5,512,078 | A | | 4/1996 | Griffin ......................... 65/484 |
| 5,519,803 | A | | 5/1996 | Shiono et al. .............. 385/132 |
| 5,578,106 | A | | 11/1996 | Fleming, Jr. et al. ......... 65/391 |
| 5,612,778 | A | | 3/1997 | Hall et al. ................. 356/4.09 |
| 5,682,453 | A | | 10/1997 | Daniel et al. ................. 385/99 |
| 5,691,999 | A | | 11/1997 | Ball et al. ..................... 373/20 |
| 5,721,802 | A | | 2/1998 | Francis et al. ............. 385/137 |
| 5,745,626 | A | | 4/1998 | Duck et al. ................. 385/96 |
| 5,771,251 | A | | 6/1998 | Kringlebotn et al. .......... 372/6 |
| 5,841,131 | A | | 11/1998 | Schroeder et al. ..... 250/227.17 |
| 5,844,927 | A | | 12/1998 | Kringlebotn ................... 372/6 |
| 5,926,599 | A | | 7/1999 | Bookbinder et al. ........ 385/137 |
| H1813 | H | * | 11/1999 | Kersey ........................ 372/94 |
| 6,018,534 | A | | 1/2000 | Pan et al. ...................... 372/6 |
| 6,122,305 | A | * | 9/2000 | Putnam et al. ................ 372/94 |
| 6,122,430 | A | | 9/2000 | Bookbinder et al. ........ 385/137 |
| 6,125,216 | A | * | 9/2000 | Haran et al. ................... 385/12 |
| 6,229,827 | B1 | * | 5/2001 | Fernald et al. ................ 372/20 |
| 6,301,410 | B1 | | 10/2001 | Carberry et al. ............... 385/37 |
| 6,307,990 | B1 | | 10/2001 | Carberry et al. ............... 385/37 |
| 6,349,165 | B1 | | 2/2002 | Lock .......................... 385/136 |
| 6,452,667 | B1 | * | 9/2002 | Fernald et al. ............. 356/73.1 |
| 2002/0172446 | A1 | * | 11/2002 | Fernald et al. ................ 385/12 |

FOREIGN PATENT DOCUMENTS

| | | | |
|---|---|---|---|
| EP | 0359351 | 9/1992 | ........... C03B/37/15 |
| EP | 0302745 | 3/1994 | |
| EP | 0409447 | 11/1996 | |
| EP | 0855608 | 7/1998 | |
| GB | 2299203 | 9/1996 | |
| WO | WO 8204328 | 12/1982 | |
| WO | WO 9530926 | 11/1995 | |
| WO | WO 9932911 | 3/1998 | |
| WO | WO 9831987 | 7/1998 | |
| WO | WO 9944026 | 2/1999 | |

OTHER PUBLICATIONS

Quartzdyne, Inc., Series QU/QG Spec Specification Sheet and p. 6, Section 1, General Information taken from Quartzdyne Pressure Transducers General Catalog and Operating Manual for Quartzdyne Downhole High Pressure Transducers (Series QU, QG, QL, TMC, 1XP and LP) Apr. 1, 1997.

"The Thickness–Shear Quartz Resonator: A Rugged, Precision Pressure Transducer" Product Feature from Sensors, Jul. 1990.

"Design of DFB fibre lasers", V. C. Lauridsen et al, Electron. Lett., vol. 34, No. 21, pp. 2028–2030, 1998.

"Erbium doped fibre DFB laser with permanent $\pi/2$ phase–shift induced by UV post–processing", P. Varming et al, IOOC 95, Tech. Digest, vol. 5, PDI–3, 1995.

* cited by examiner

STRAIN-ISOLATED BRAGG GRATING TEMPERATURE SENSOR

CROSS REFERENCES TO RELATED APPLICATIONS

This is a continuation-in-part of U.S. patent application Ser. No. 09/400,364 filed Sep. 20, 1999 (now abandoned), which is a continuation-in-part of U.S. patent application Ser. No. 09/205,847, filed Dec. 4, 1998 (now abandoned). Also, copending U.S. patent application Ser. No. 09/455,867, entitled "Bragg Grating Pressure Sensor", Ser. No. 09/455,865, entitled "Tube-Encased Fiber Grating", Ser. No. 09/456,113, entitled "Pressure-Isolated Bragg Grating Temperature Sensor", and Ser. No. 09/455,868, entitled "Large Diameter Optical Waveguide, Grating, and Laser", all filed contemporaneously herewith, contain subject matter related to that disclosed herein.

Technical Field

This invention relates to fiber gratings, and more particularly to a tube-encased strain-isolated fiber grating temperature sensor.

BACKGROUND ART

It is known in the art of fiber optics that Bragg gratings embedded in an optical fiber may be embedded in a structure and used to sense parameters such as temperature and/or strain of the structure, such as is described in U.S. Pat. No. 4,806,012, entitled "Distributed, Spatially Resolving Optical Fiber Strain Gauge", to Meltz et al, and U.S. Pat. No. 4,996,419, entitled "Distributed Multiplexed Optical Fiber Bragg Grating Sensor Arrangement", to Morey. It is also known that the reflection wavelength λ of the grating 12 changes with temperature ($\Delta\lambda/\Delta T$) due to the change in refractive index and grating spacing over temperature, such as is described in U.S. Pat. No. 5,042,898, entitled "Incorporated Bragg Filter Temperature Compensated Optical Waveguide Device", to Morey et al.

However, when an optical fiber grating is used to measure solely temperature and it is not embedded within or bonded or attached to an overall structure being monitored, any strain on the fiber and grating cause the grating reflection wavelength to shift which can cause inaccuracies in the grating temperature measurement.

SUMMARY OF THE INVENTION

Objects of the present invention include provision of a fiber grating temperature sensor that allows the grating to be used as a temperature sensor in the presence of strain on the optical fiber.

According to the present invention a strain-isolated optical temperature sensor, comprises an optical sensing element, having an outer transverse dimension of at least 0.3 mm and having at least one reflective element disposed therein, the reflective element having a reflection wavelength; an optical fiber exiting from at least one axial end of the sensing element; at least a portion of the sensing element having a transverse cross-section which is contiguous and made of substantially a single material where at least a portion of the reflective element is located; and the reflection wavelength changing due to a change in the temperature of the sensing element and not changing due to strain on the optical fiber.

According further to the present invention, the sensing element comprises: an optical fiber, having the reflective element embedded therein; and a tube, having the optical fiber and the reflective element encased therein, the tube being fused to at least a portion of the fiber. According further to the present invention, the sensing element comprises a large diameter optical waveguide having an outer cladding and an inner core disposed therein and having the reflective element disposed therein.

According further to the present invention, the sensing element comprises: a tube being fused to at least a portion of an optical fiber along a longitudinal axis of the tube; a large diameter optical waveguide having an outer cladding and an inner core disposed therein; and the tube and the wavguide being axially fused and optically coupled together, and the reflective element is embedded either in the fiber and encased in the tube or is disposed in the optical waveguide. According further to the present invention, the sensing element is made of a glass material.

The present invention provides a bragg grating disposed in an optical sensing element which includes an optical fiber fused to at least a portion of a glass capillary tube ("tube encased fiber/grating") and/or a large diameter waveguide grating having an optical core and a wide cladding, which senses temperature changes but is substantially not sensitive to (or substantially isolated from) strains on the element caused by the fiber or other effects. The element may be made of a glass material. Also, it allows the grating to be strain-isolated from strains elsewhere on the fiber.

Also, one or more gratings, fiber lasers, or a plurality of fibers or optical cores may be disposed in the element.

The grating(s) or laser(s) may be "encased" in the tube by having the tube fused to the fiber on the grating area and/or on opposite axial ends of the grating area adjacent to or a predetermined distance from the grating. The grating(s) or laser(s) may be fused within the tube or partially within or to the outer surface of the tube. Also, one or more wavguides and/or the tube encased fiber/gratings may be axially fused to form the sensing element.

Further, the invention may be used as an individual sensor or as a plurality of distributed multiplexed sensors. Also, the invention may be a feed-through design or a non-feed-through design.

The invention may be used in harsh environments, such as in oil and/or gas wells, engines, combustion chambers, etc. For example, the invention may be an all glass sensor capable of operating at high temperatures (>150° C.). The invention will also work equally well in other applications independent of the type of environment.

The foregoing and other objects, features and advantages of the present invention will become more apparent in light of the following detailed description of exemplary embodiments thereof.

BEST MODE FOR CARRYING OUT THE INVENTION

Figure 1:
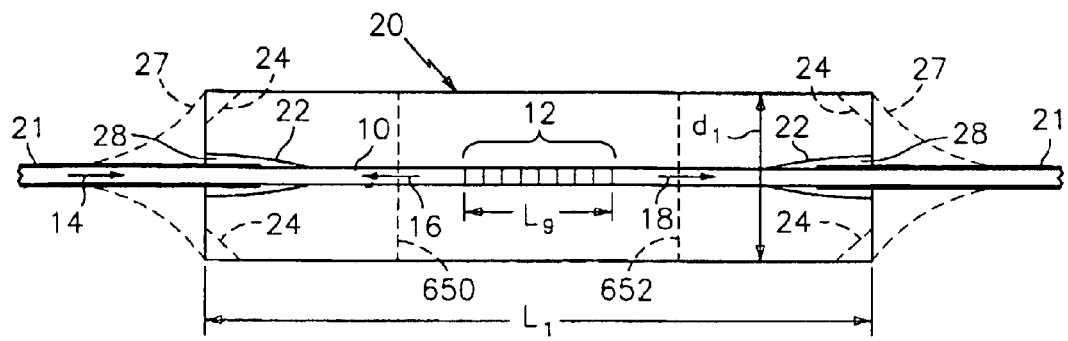
FIG. 1 is a side view of a tube-encased fiber grating temperature sensor, in accordance with the present invention.

Referring to FIG. 1, a strain-isolated Bragg grating temperature sensor comprises a known optical waveguide 10, e.g., a standard telecommunication single mode optical fiber, having a Bragg grating 12 impressed (or embedded or imprinted) in the fiber 10. The fiber 10 has an outer diameter of about 125 microns and comprises silica glass ($SiO_2$) having the appropriate dopants, as is known, to allow light 14 to propagate along the fiber 10. The grating 12, as is known, is a periodic or aperiodic variation in the effective refractive index and/or effective optical absorption coefficient of an optical waveguide, similar to that described in U.S. Pat. Nos. 4,725,110, and 4,807,950 entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention. However, any wavelength-tunable grating or reflective element embedded, etched, imprinted, or otherwise formed in the fiber 10 may be used if desired. As used herein, the term "grating" means any of such reflective elements. Further, the reflective element (or grating) 12 may be used in reflection and/or transmission of light.

Other materials and dimensions for the optical fiber or waveguide 10 may be used if desired. For example, the fiber 10 may be made of any glass, e.g., silica, phosphate glass, or other glasses, or made of glass and plastic, or solely plastic. For high temperature applications, optical fiber made of a glass material is desirable. Also, the fiber 10 may have an outer diameter of 80 microns or other diameters. Further, instead of an optical fiber, any optical waveguide may be used, such as, a multi-mode, birefringent, polarization maintaining, polarizing, multi-core, or multi-cladding optical waveguide, or a flat or planar waveguide (where the waveguide is rectangular shaped), or other waveguides. As used herein the term "fiber" includes the above described waveguides.

The light 14 is incident on the grating 12 which reflects a portion thereof as indicated by a line 16 having a predetermined wavelength band of light centered at a reflection wavelength λb, and passes the remaining wavelengths of the incident light 14 (within a predetermined wavelength range), as indicated by a line 18.

The fiber 10 with the grating 12 therein is encased within and fused to at least a portion of a cylindrical glass capillary tube 20 (discussed more hereinafter. The tube 20 has an outer diameter d1 of about 3 mm and a length L1 of about 10 mm. The grating 12 has a length Lg of about 5 mm. Alternatively, the length L1 of the tube 20 may be substantially the same length as the length Lg of the grating 12, such as by the use of a longer grating, or a shorter tube. Other dimensions and lengths for the tube 20 and the grating 12 may be used. Also, the fiber 10 and grating 12 need not be fused in the center of the tube 20 but may be fused anywhere in the tube 20. Also, the tube 20 need not be fused to the fiber 10 over the entire length of the tube 20.

The tube 20 is made of a glass material, such as natural or synthetic quartz, fused silica, silica ($SiO_2$), Pyrex® by Corning (boro silicate), or Vycor® by Corning (about 95% silica and 5% other constituents such as Boron Oxide), or other glasses. The tube should be made of a material such that the tube 20 (or the inner diameter surface of a bore hole in the tube 20) can be fused to (i.e., create a molecular bond with, or melt together with) the outer surface (or cladding) of the optical fiber 10 such that the interface surface between the inner diameter of the tube 20 and the outer diameter of the fiber 10 become substantially eliminated (i.e., the inner diameter of the tube 20 cannot be distinguished from and becomes part of the cladding of the fiber 10.)

For best thermal expansion matching of the tube 20 to the fiber 10 over a large temperature range, the coefficient of thermal expansion (CTE) of the material of the tube 20 should substantially match the CTE of the material of the fiber 10. In general, the lower the melting temperature of the glass material, the higher the (CTE). Thus, for a silica fiber (having a high melting temperature and low CTE) and a tube made of another glass material, such as Pyrex® or Vycor® (having a lower melting temperature and higher CTE) results in a thermal expansion mismatch between the tube 20 and the fiber 10 over temperature.

However, it is not required for the present invention that the CTE of the fiber 10 match the CTE of the tube 20. In particular, the more the CTE mismatch between the fiber 10 and the tube 20, the greater the sensitivity of grating reflection wavelength shift to temperature changes, and the more sensitive the temperature sensor becomes. For example, for a silica fiber (CTE=$5.5 \times 10^{-7}$/° C.), a tube 20 made of Vycor® (CTE=$7.5 \times 10^{-7}$/° C.) or Pyrex® (CTE=$32.5 \times 10^{-7}$/° C.) would provide greater sensitivity than a silica tube.

Instead of the tube 20 being made of a glass material, other elastically deformable materials may be used provided the tube 20 can be fused to the fiber 10. For example, for an optical fiber made of plastic, a tube made of a plastic material may be used.

With the fiber grating 12 encased in the tube 20, for any axial strain exerted on the tube 20 by the fiber 10 outside of the tube 20 the strain seen by the grating 12 in the tube 20 will be reduced by an amount related to the increased transverse cross sectional area of the tube 20 as compared to the fiber 10, thereby providing a temperature sensor element that is substantially isolated from axial strain. Thus, any shift in the reflection wavelength of the grating 12 will be due to temperature change and not a fiber strain change. Accordingly, the diameter (or transverse dimension) and length L of the tube 20 is set to have the desired amount of isolation from the grating for a predetermined amount of strain on the element.

For example, if the sensing element is rigidly fixed and the optical fiber was axially pulled in a direction away from the element, the sensing element may be sized such that the fiber would exhibit strain but the grating in the element would not, and thus the grating wavelength would not change due to the strain on the fiber. A similar result would occur if the sensing element is not rigidly fixed and optical fibers exiting from both axial ends of the element are axially pulled in opposite directions away from the element. The invention will also provide strain isolation or reduction from other causes of axial strain exerted on the sensing element, such as mounting strains, etc.

The axial ends of the tube 20 where the fiber 10 exits the tube 20 may have an inner region 22 which is inwardly tapered (or flared) away from the fiber 10 to provide strain relief for the fiber 10 or for other reasons. In that case, an area 28 between the tube 20 and the fiber 10 may be filled with a strain relief filler material, e.g., polyimide, silicone, or other materials. Also, the tube 20 may have tapered (or beveled or angled) outer corners or edges 24 to provide a seat for the tube 20 to mate with another part (not shown) or for other reasons.

Alternatively, instead of having the inner tapered region 22, the axial ends of the tube 20 where the fiber 10 exits the tube 20 may have an outer tapered (or fluted, conical, or nipple) section, shown as dashed lines 27, which has an outer geometry that decreases down to the fiber 10 (discussed more hereinafter). We have found that using the fluted sections 27 provides enhanced pull strength at and near the interface between the fiber 10 and the tube 20, e.g., 6 lbf or more, when the fiber 10 is pulled along its longitudinal axis.

The tube 20 may have end (or transverse) cross-sectional shapes other than circular, such as square, rectangular, elliptical, clam-shell, or other shapes, and may have side-view cross-sectional shapes other than rectangular, such as circular, square, elliptical, clam-shell, or other shapes. Also, the tube 20 may have various different geometries, depending on the application. For example, the tube-encased fiber grating temperature sensor may be part of a larger sensor, such as a temperature-compensated pressure sensor, as is described in U.S. patent application Ser. No. 09/399,404 entitled "Tube-Encased Fiber Grating Pressure Sensor" (now abandoned). Any varying geometry of the tube 20 may be formed as described in the U.S. patent application Ser. No. 09/399,495, entitled "Tube-Encased Fiber Grating" (now abandoned), which is incorporated herein by reference.

Where the fiber 10 exits the tube 20, the fiber 10 may have an external protective buffer layer 21 to protect the outer surface of the fiber 10 from damage. The buffer 21 may be made of polyimide, silicone, Teflon® (polytetraflouroethylene), carbon, gold, and/or nickel, and have a thickness of about 25 microns. Other thicknesses and buffer materials for the buffer layer 21 may be used. If the inner tapered axial region 22 is used and is large enough, the buffer layer 21 may be inserted into the region 22 to provide a transition from the bare fiber to a buffered fiber. Alternatively, if the region has the external taper 27, the buffer 21 would begin where the fiber exits the tube 20. If the buffer 21 starts after the fiber exit point, the fiber 10 may be recoated with an additional buffer layer (not shown) which covers any bare fiber outside of the fused region and overlaps with the buffer 21 and may also overlap some of the region 27 or the end of the tube 20.

The grating 12 may be impressed in the fiber 10 before or after the capillary tube 20 is encased around the fiber 10.

If the grating 12 is impressed in the fiber 10 after the tube 20 is encased around the grating 12, the grating 12 may be written through the tube 20 into the fiber 10 as is described in copending U.S. patent application Ser. No. 09/205,845, entitled "Method and Apparatus For Forming A Tube-Encased Bragg Grating", filed contemporaneously herewith.

To encase the fiber 10 within the tube 20, the tube 20 may be heated, collapsed, and fused to the grating 12, by a laser, filament, flame, or by other fusing techniques, as is described in the aforementioned U.S. patent application Ser. No. 09/399,495, entitled "Tube-Encased Fiber Grating" (now abandoned), filed contemporaneously herewith. Other techniques may be used for collapsing and fusing the tubes 20 to the fiber 10, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber 10 to the tube 20, such as using a high temperature glass solder, e.g., a silica solder (powder or solid), such that the fiber 10, the tube 20 and the solder all become fused to each other, or using laser welding/fusing or other fusing techniques. Also, the fiber may be fused within the tube or partially within or on the outer surface of the tube (discussed hereinafter with FIG. 9).

The grating 12 may be encased in the tube 20 having an initial pre-strain from the tube (compression or tension) or no pre-strain. For example, if Pyrex® or another glass that has a larger coefficient of thermal expansion than that of the fiber 10 is used for the tube 20, when the tube 20 is heated and fused to the fiber and then cooled, the grating 12 is put in compression by the tube 20. Alternatively, the fiber grating 12 may be encased in the tube 20 in tension by putting the grating intension during the tube heating and fusing process. Also, the fiber grating 12 may be encased in the tube 20 resulting in neither tension nor compression on the grating 12.

Figure 2:
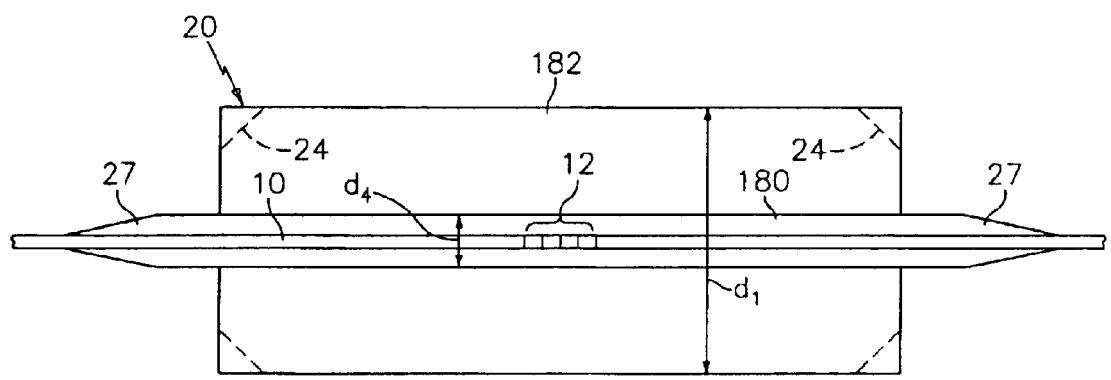
FIG. 2 is a side view of a tube-encased fiber grating temperature sensor having more than one tube around the grating, in accordance with the present invention.

Referring to FIG. 2, more than one concentric tube may be fused together to form the tube 20 of the present invention. For example, a small inner capillary tube 180 having an outer diameter d4 of about 0.5 mm, may be located within a larger outer capillary tube 182, having the diameter d1 discussed hereinbefore, and the two tubes 180,182 are fused together. One or both ends of the small tube 180 may be shrunk down around the fiber 10 to form the fluted sections 27. Other values for the diameters d1, d4, of the inner and outer tubes 180,182, may be used if desired. Also, more than two concentric capillary tubes may be used. The material of the tubes may be the same to minimize thermal expansion mismatch over temperature.

Figure 3:
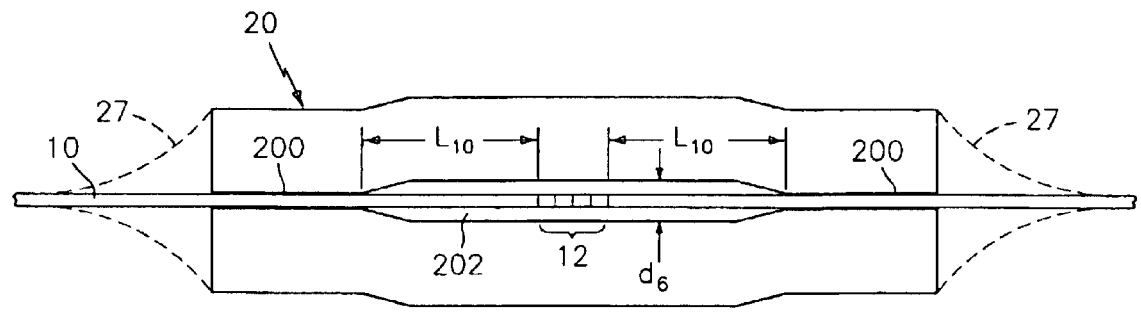
FIG. 3 is a side view of a tube-encased fiber grating temperature sensor where the tube is fused on opposite axial ends of the grating area, in accordance with the present invention.
Figure 4:
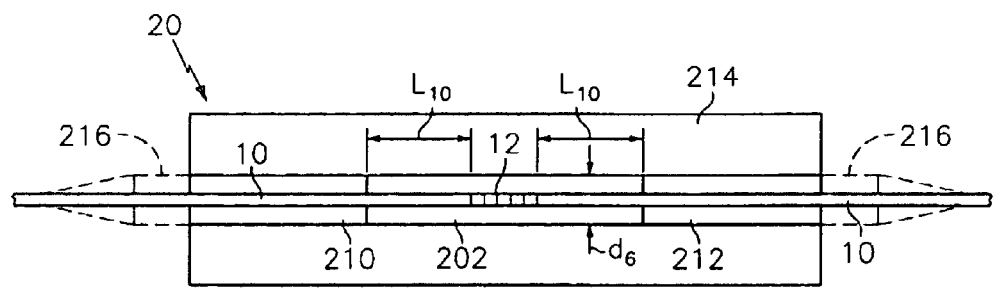
FIG. 4 is a side view of an alternative tube-encased fiber grating temperature sensor where the tube is fused on opposite axial ends of the grating area, in accordance with the present invention.

Referring to FIGS. 3 and 4, alternatively, the tube 20 may be fused to the fiber 10 on opposite sides of the grating 12 adjacent to or a predetermined distance L10 from the grating 12, where L10 can be any desired length at the edge of the grating 12 (L10=zero). In particular, regions 200 of the tube 20 are fused to the fiber 10 and a central section 202 of the tube around the grating 12 is not fused to the fiber 10. The region 202 around the grating 12 may contain ambient air or be evacuated (or be at another pressure) or may be partially or totally filled with an adhesive, e.g., epoxy, or other filling material, e.g., a polymer or silicone, or another material. The inner diameter d6 of the tube 20 may be close to the fiber 10, e.g., about 0.01 to 10 microns larger than the diameter of the optical fiber 10, e.g., 125.01 to 135 microns or may have larger diameters, as it is not required to radially constrain the fiber 10 or grating 12 in the section 202 for temperature sensing. Moreover, the fiber 10 and grating 12 in the section 202 may be taught or may have some slack. Also, the distance L10 need not be symmetric around both sides of the grating 12. Referring to FIG. 4, alternatively, the same result as FIG. 3 can be achieved by fusing two separate tubes 210,212 on opposite sides of the grating 12 and then fusing an outer tube 214 across the tubes 210,212. Alternatively, the tubes 210,212 may extend beyond the ends of the outer tube 214 as indicated by the dashed lines 216 (axially extended sections). Alternatively, the tube 20 may be a single piece with a shape indicative of the tubes 210, 212, 214.

Figure 5:
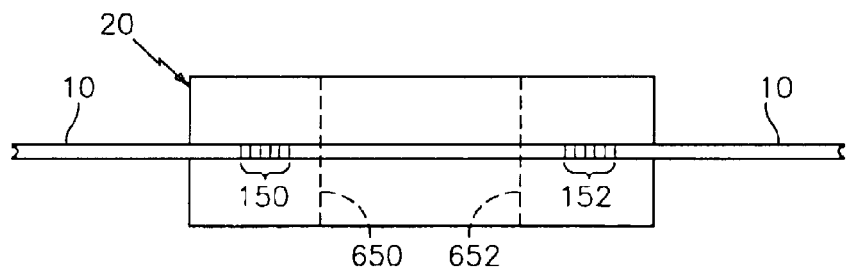
FIG. 5 is a side view of a tube-encased fiber grating temperature sensor having more than one grating encased in the tube, in accordance with the present invention.

Referring to FIG. 5, for any of the embodiments described herein, instead of a single grating encased within the tube 20, two or more gratings 150,152 may be embedded in the fiber 10 that is encased in the tube 20. Such multiple gratings 150,152 may be used to measure the temperature at multiple points along the tube 20. In that case, the gratings 150,152 may have different reflection wavelengths $\lambda 1, \lambda 2$ and/or profiles, respectively.

Alternatively, the multiple gratings 150,152 may be used to sense temperature individually in a known Fabry Perot arrangement. Further, one or more fiber lasers, such as that described in U.S. Pat. No. 5,513,913, entitled "Active Multipoint Fiber Laser Sensor", U.S. Pat. No. 5,564,832, entitled "Birefringent Active Fiber Laser Sensor", or U.S. Pat. No. 5,666,372, "Compression Tuned Fiber Laser" may be embedded within the fiber 10 in the tube 20, which are incorporated herein by reference to the extent necessary to understand the present invention. In that case, the gratings 150,152 form a cavity and fiber 10 at least between the gratings 150,152 (and may also include the gratings 150,152 and/or the fiber 10 outside the gratings, if desired) would be doped with a rare earth dopant, e.g., erbium and/or ytterbium, and the lasing wavelength would shift as temperature changes.

Figure 11:
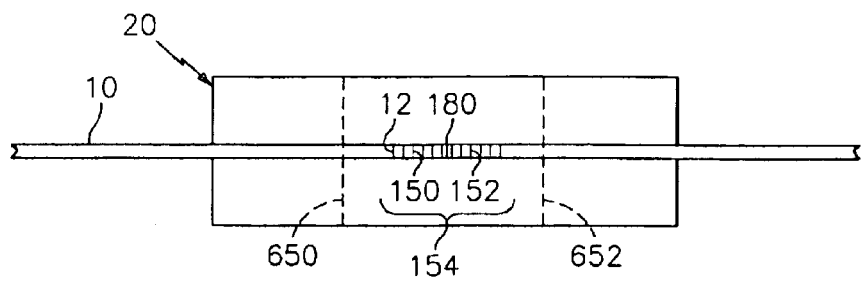
FIG. 11 is a side view of a tube-encased fiber grating temperature sensor having a tunable DFB fiber laser encased in a tube, in accordance with the present invention.

Referring to FIG. 11, another type of tunable fiber laser that may be used is a tunable distributed feedback (DFB) fiber laser 154, such as that described in V. C. Lauridsen, et al, "Design of DFB Fibre Lasers", Electronic Letters, Oct. 15, 1998, Vol. 34, No. 21, pp 2028–2030; P. Varming, et al, "Erbium Doped Fiber DGB Laser With Permanent $\pi/2$ Phase-Shift Induced by UV Post-Processing", IOOC '95, Tech. Digest, Vol. 5, PD1–3, 1995; U.S. Pat. No. 5,771,251, "Optical Fibre Distributed Feedback Laser", to Kringlebotn et al; or U.S. Pat. No. 5,511,083, "Polarized Fiber Laser Source", to D'Amato et al. In that case, the grating 12 is written in a rare-earth doped fiber and configured to have a phase shift of $\lambda/2$ (where $\lambda$ is the lasing wavelength) at a predetermined location 180 near the center of the grating 12 which provides a well defined resonance condition that may be continuously tuned in single longitudinal mode operation without mode hopping, as is known. Alternatively, instead of a single grating, the two gratings 150,152 may be placed close enough to form a cavity having a length of $(N+\frac{1}{2})\lambda$, where N is an integer (including 0) and the gratings 150,152 are in rare-earth doped fiber.

Alternatively, the DFB laser 154 may be located on the fiber 10 between the pair of gratings 150,152 (FIG. 4) where the fiber 10 is doped with a rare-earth dopant along at least a portion of the distance between the gratings 150,152. Such configuration is referred to as an "interactive fiber lasers", as is described by J. J. Pan et al, "Interactive Fiber Lasers with Low Noise and Controlled Output Power", E-tek Dynamics, Inc., San Jose, Calif., internet web site www.e-tek-com/products/whitepapers. Other single or multiple fiber laser configurations may be disposed on the fiber 10 if desired.

Figure 6:
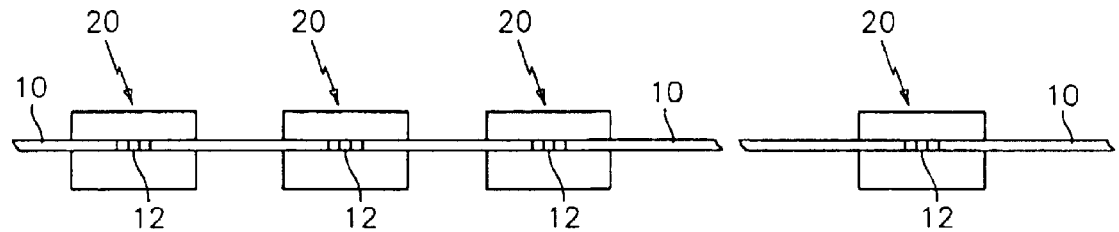
FIG. 6 is a side view of a plurality of tube-encased fiber grating temperature sensors in separate tubes connected in series by a common optical fiber, in accordance with the present invention.

Referring to FIG. 6, a plurality of the tubes/temperature sensors 20 described herein, each having at least one grating 12 encased therein, may be connected in series by the common optical fiber 10 to measure multiple temperature points as distributed sensors. Any known multiplexing techniques may be used to distinguish one sensor signal from another sensor signal, such as wavelength division multiplexing (WDM) or time division multiplexing (TDM) or other multiplexing techniques. In that case, the grating 12 in each sensor may have a different reflection wavelength.

Figure 7:
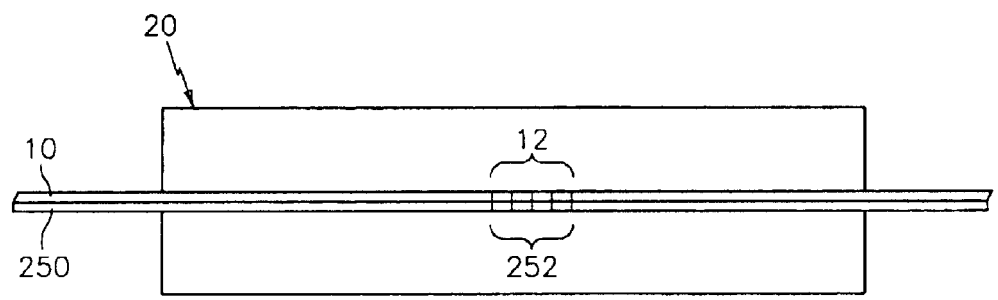
FIG. 7 is a side view of two fiber grating temperature sensors on two separate optical fibers encased in a common tube, in accordance with the present invention.
Figure 8:
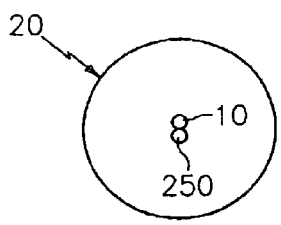
FIG. 8 is an end view of the embodiment of FIG. 7, in accordance with the present invention.

Referring to FIGS. 7 and 8, alternatively, two or more fibers 10,250, each having at least one grating 12,252 therein, respectively, may be encased within the tube 20. In that case, the bore hole in the tube 20 prior to heating and fusing may be other than circular, e.g., square, triangle, etc. Also, the bore hole for the tube 20 need not be centered along the center line of the tube 20.

Figure 9:
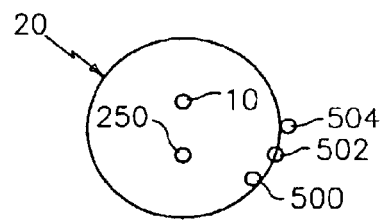
FIG. 9 is an end view of two fiber grating temperature sensors on two separate optical fibers encased in a common tube and separated by distance, in accordance with the present invention.

Referring to FIG. 9, alternatively, instead of the fibers 10,250 touching each other as shown in FIG. 8, the fibers 10,250 may be spaced apart in the tube 20 by a predetermined distance. The distance may be any desired distance between the fibers 10,250. Also, for any of the embodiments shown herein, as discussed hereinbefore, part or all of an optical fiber and/or grating may be fused within, partially within, or on the outer surface of the tube 20, as illustrated by fibers 500,502,504, respectively.

Also, the grating(s) or laser(s) described herein may be oriented in any desired direction on the tube, e.g., longitudinally, radially, circumferentially, angled, curved, or other orientations. Also, the term "tube" as used herein may also mean a block of material having the properties described herein.

Figure 10:
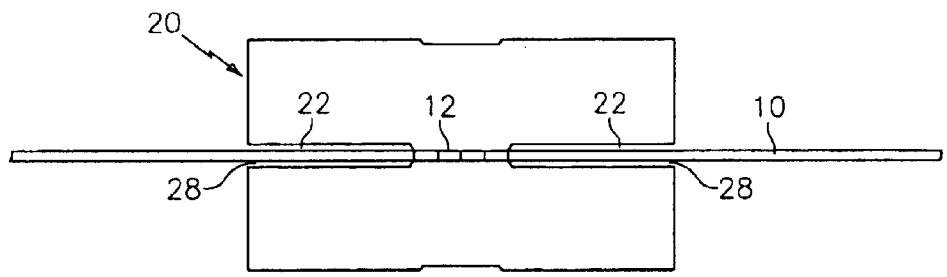
FIG. 10 is a side view of a tube-encased fiber grating temperature sensor where the tube is fused to the fiber only over the length of the grating, in accordance with the present invention.

Referring to FIG. 10, alternatively, the tube 20 may be fused onto the fiber 10 only where the grating 12 is located. In that case, if the tube is longer than the grating 12, the inner tapered regions 22 discussed hereinbefore may exist and the areas 28 between the tube 20 and the fiber 10 may be filled with a filler material, as discussed hereinbefore.

The fluted sections 27 (FIG. 1) may be formed in various ways, such as is described in the aforementioned U.S. patent application Ser. No. 09/399,495, entitled "Tube-Encased Fiber Grating" (now abandoned). For example, by heating the tube 20 and pulling the tube and/or the fiber 10 or using other glass formation techniques such as grinding, polishing or etching the axial ends of the capillary tube 20. The sections 27 may be created before, during, or after the heating and fusing of the tube 20 to the fiber 10.

Also, the inner region 22 may be created by numerous techniques such as is described in the aforementioned U.S. patent application Ser. No. 09/399,495, entitled "Tube-Encased Fiber Grating" (now abandoned). For example, not fusing the tube 20 to the fiber 10 in the region 22 or to create a region 22 that is larger than the inner diameter d6 of the tube 20, the tube 20 may be heated in the desired region to be expanded and internal pressure applied to the tube 20.

Further, for any of the embodiments shown herein, instead of the fiber 10 passing through the tube 20, the fiber 10 may be single-ended, i.e., only one end of the fiber 10 exits the tube 20. In that case, on end of the fiber 10 would be at the exit point of the fiber 10 from the tube 20 or prior to the exit point.

Figure 12:
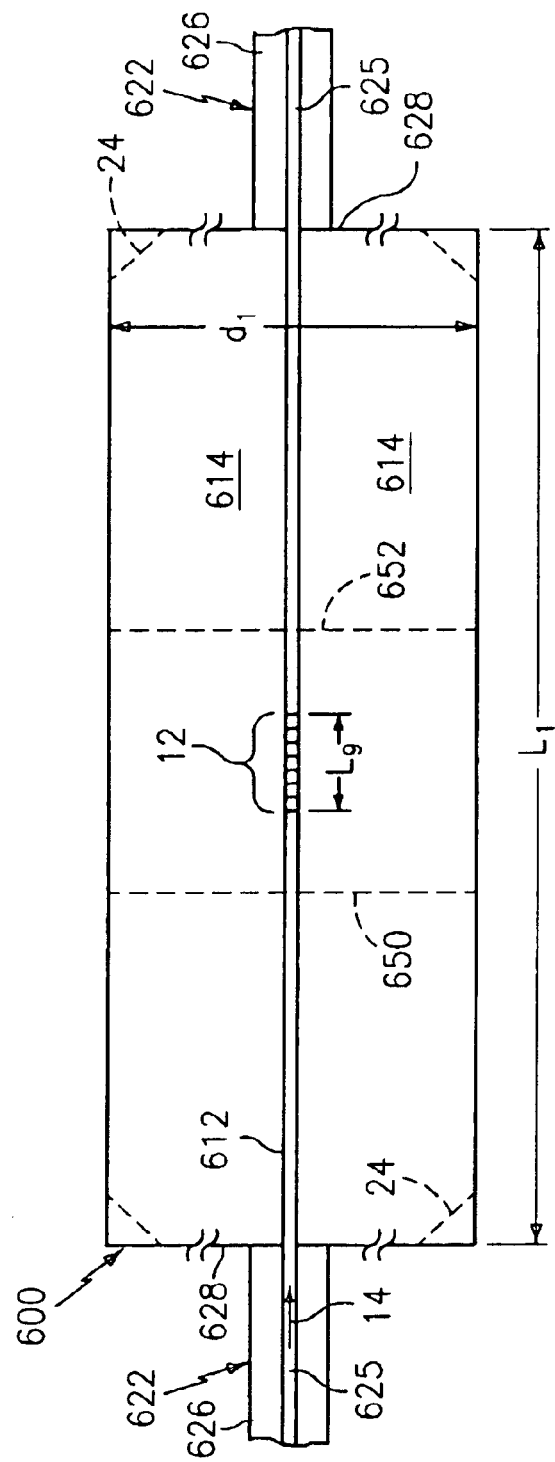
FIG. 12 is a side view of a large diameter optical waveguide having a grating disposed therein, in accordance with the present invention.

Referring to FIG. 12, alternatively, a portion of or all of the tube-encased fiber grating 20 may be replaced by a large diameter silica waveguide grating 600, such as that described in copending U.S. patent application Ser. No. 09/455,868, entitled "Large Diameter Optical Waveguide, Grating and Laser", which is incorporated herein by reference. The waveguide 600 has a core 612 (equivalent to the core of the fiber 10) and a cladding 614 (equivalent to the fused combination of the tube 20 and the cladding of the fiber 10) and having the grating 12 embedded therein. The overall length L1 of the waveguide 600 and the waveguide diameter d2 are set the same as that described hereinbefore for the tube 20 (i.e., such that the tube 20 will not buckle over the desired grating wavelength tuning range) and the outer diameter of the waveguide is at least 0.3 mm. An optical fiber 622 (equivalent to the fiber 10 in FIG. 1) having a cladding 626 and a core 625 which propagates the light signal 14, is spliced or otherwise optically coupled to one or both axial ends 628 of the waveguide 10 using any known or yet to be developed techniques for splicing fibers or coupling light from an optical fiber into a larger waveguide, that provides acceptable optical losses for the application.

The large diameter waveguide with grating 600 may be used in the same ways as the tube encased grating 20 is used herein where the fiber 10 is analogous to (and interchangeable with) the core 612 of the waveguide 600. All alternative embodiments described herein for the tube 20 and the tube-encased grating are also applicable to the waveguide 600 where feasible, including having a fiber laser or a DFB fiber laser, multiple fibers (or cores), various geometries, etc.

The tube-encased fiber grating 20 and the large diameter waveguide grating 600 may each also be referred to herein as an "optical sensing element". The tube-encased grating 20 and the large diameter waveguide grating 600 have substantially the same composition and properties in the locations where the tube 20 is fused to the fiber 10, because the end (or transverse) cross-section of the tube-encased grating 20 and the large diameter waveguide grating 600 are contiguous (or monolithic) and made of substantially the same material across the cross-section, e.g., a glass material, such as doped and undoped silica. Also, in these locations both have an optical core and a large cladding.

Also, the waveguide 600 and the tube-encased grating 20 may be used together to form any given embodiment of the sensing element described herein. In particular, one or more axial portion(s) of the sensing element may be a tube-encased grating or fiber and/or one or more other axial portion(s) may be the waveguide 600 which are axially spliced or fused or otherwise mechanically and optically coupled together such that the core of said waveguide is aligned with the core of the fiber fused to the tube. For example, a central region of the sensing element may be the large waveguide and one or both axial ends may be the tube-encased fiber which are fused together as indicated by dashed lines 650,652, or visa versa (FIGS. 1,5,11,12).

It should be understood that the dimensions, geometries, and materials described for any of the embodiments herein, are merely for illustrative purposes and as such, any other dimensions, geometries, or materials may be used if desired, depending on the application, size, performance, manufacturing or design requirments, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A strain-isolated optical temperature sensor, comprising:

an optical sensing element having a longitudinal dimension and an outer transverse dimension perpendicular to the longitudinal dimension, at least a portion of the optical sensing element having an outer transverse dimension of at least 0.3 mm and having at least one reflective element disposed therein, said reflective element having a reflection wavelength, wherein said optical sensing element is not pressure-isolated from external pressure;

an optical fiber extending from at least one axial end of said sensing element;

at least a portion of said sensing element having a transverse cross-section which is continuous and made of substantially a single material across said outer transverse dimension where at least a portion of said reflective element is located; and said reflection wavelength changing due to a change in the temperature of said sensing element and not changing due to strain on said optical fiber.

2. The apparatus of claim 1 wherein said sensing element comprises:

said optical fiber, having said reflective element embedded therein; and a tube, having said optical fiber and said reflective element encased therein, said tube being fused to at least a portion of said fiber.

3. The apparatus of claim 2, wherein said fiber and said tube are made of materials with different coefficients of thermal expansion.

4. The apparatus of claim 2 wherein said tube is fused to said optical fiber where said reflective element is located.

5. The apparatus of claim 2 wherein said tube is fused to said optical fiber on opposite axial sides of said reflective element.

6. The apparatus of claim 2 wherein said optical fiber is oriented along a longitudinal axis of said tube.

7. The apparatus of claim 2, wherein said tube has a plurality of said optical fibers encased in said tube.

8. The apparatus of claim 1 wherein said sensing element comprises a large diameter optical waveguide having an outer cladding and an inner core disposed therein and having said reflective element disposed therein, said waveguide having an outer transverse dimension of at least 0.3 mm and at least one axial end of said waveguide being connected and optically coupled to said optical fiber.

9. The apparatus of claim 8, wherein said waveguide has a plurality of optical cores disposed therein.

10. The apparatus of claim 1 wherein said sensing element comprises:

a tube-encased fiber, comprising a tube fused to at least a portion of a second optical fiber along a longitudinal axis of said tube;

a large diameter optical waveguide having an outer cladding and an inner core disposed therein, said waveguide having an outer transverse dimension of at least 0.3 mm;

said tube-encased fiber and said waveguide being axially connected and optically coupled together; and said at least one reflective element being disposed within at least one of said tube-encased fiber and said large diameter waveguide.

11. The apparatus of claim 10, wherein said reflective element is embedded in said tube-encased fiber along said longitudinal axis of said tube.

12. The apparatus of claim 10, wherein said reflective element is disposed in said optical waveguide.

13. The apparatus of claim 10, wherein said second optical fiber and said optical fiber are the same optical fiber.

14. The apparatus of claim 1 wherein said sensing element is made of a glass material.

15. The apparatus of claim 1, wherein said sensing element is made of silica.

16. The apparatus of claim 1 wherein at least a portion of said sensing element has a cylindrical shape.

17. The apparatus of claim 1 wherein said sensing element has at least one outer tapered axial section.

18. The apparatus of claim 1 wherein said sensing element has at least one inner tapered axial section.

19. The apparatus of claim 1, wherein said sensing element has a plurality of reflective elements disposed therein.

20. The apparatus of claim 1, wherein said sensing element has at least one pair of reflective elements disposed therein and at least a portion of said sensing element is doped with a rare-earth dopant between said pair of elements to form a laser.

21. The apparatus of claim 20, wherein said laser lasers at a lasing wavelength which changes as temperature of said sensing element changes.

22. The apparatus of claim 1, wherein at least a portion of said sensing element is doped with a rare-earth dopant where said reflective element is located and said reflective element is configured to form a DFB laser.

23. The apparatus of claim 22 wherein said DFB laser lases at a lasing wavelength which changes as temperature of said sensing element changes.

24. The apparatus of claim 1 wherein said reflective element comprises a Bragg grating.

25. The apparatus of claim 1, wherein said outer transverse dimension of at least a portion of said sensing element is greater than about the dimension selected from the group consisting of: 0.4 mm, 0.5 mm, 0.6 mm, 0.7 mm, 0.8 mm, 0.9 mm, 1.0 mm, 1.2 mm, 1.4 mm, 1.6 mm, 1.8 mm, 2.0 nm, 2.1 mm, 2.3 mm, 2.5 mm, 2.7 mm, 2.9 mm, 3.0 mm, 3.3 mm, 3.6 mm, 3.9 mm, 4.0 mm, 4.2 mm, 4.5 mm, 4.7 mm, 5.0 mm, 7 mm, 10.0 mm, 50.0 mm, or 100.0 mm.

26. The apparatus of claim 1, wherein said continuous transverse cross-section across said outer transverse dimension is located along an entire length of said reflective element.

* * * * *